(12) United States Patent
Weitz et al.

(10) Patent No.: US 12,045,301 B2
(45) Date of Patent: Jul. 23, 2024

(54) CONTENT OPPORTUNITY SCORING AND AUTOMATION

(71) Applicant: DATA SKRIVE, INC., Bellevue, WA (US)

(72) Inventors: Brad Weitz, Mercer Island, WA (US); Jason Flores, Seattle, WA (US); Richard Sanchez, Seattle, WA (US)

(73) Assignee: Data Skrive, Inc., Bellevue, WA (US)

( * ) Notice: Subject to any disclaimer, the term of this patent is extended or adjusted under 35 U.S.C. 154(b) by 0 days.

(21) Appl. No.: 17/903,869

(22) Filed: Sep. 6, 2022

(65) Prior Publication Data

US 2023/0244739 A1  Aug. 3, 2023

Related U.S. Application Data (63) Continuation of application No. 16/557,849, filed on Aug. 30, 2019, now Pat. No. 11,468,139.

(60) Provisional application No. 62/725,975, filed on Aug. 31, 2018.

(51) Int. Cl.
| | | |
|---|---|---|
| G06F 17/00 | (2019.01) | |
| G06F 16/951 | (2019.01) | |
| G06F 16/9532 | (2019.01) | |
| G06F 16/957 | (2019.01) | |
| G06Q 30/0201 | (2023.01) | |
| G06Q 30/0202 | (2023.01) | |

(52) U.S. Cl.
CPC .......... *G06F 16/957* (2019.01); *G06F 16/951* (2019.01); *G06F 16/9532* (2019.01); *G06Q 30/0201* (2013.01); *G06Q 30/0202* (2013.01)

(58) Field of Classification Search
CPC .. G06F 16/957; G06F 16/951; G06F 16/9532; G06Q 30/0201; G06Q 30/0202
See application file for complete search history.

(56) References Cited

U.S. PATENT DOCUMENTS

| | | | |
|---|---|---|---|
| 6,574,624 B1 * | 6/2003 | Johnson | G06F 16/3344 707/999.005 |
| 7,912,701 B1 * | 3/2011 | Gray | G06F 40/30 704/7 |
| 9,269,068 B2 * | 2/2016 | Ward | G06Q 10/10 |
| 9,720,899 B1 | 8/2017 | Birnhaum et al. | |
| 10,235,681 B2 | 3/2019 | Chang et al. | |
| 10,740,377 B2 * | 8/2020 | McManis, Jr. | G06F 16/353 |
| 2008/0005284 A1 * | 1/2008 | Ungar | H04L 12/1859 709/219 |
| 2011/0119576 A1 | 5/2011 | Aumann | |
| 2011/0252342 A1 * | 10/2011 | Broman | G06F 16/957 715/760 |

(Continued)

FOREIGN PATENT DOCUMENTS

| | | | | |
|---|---|---|---|---|
| CN | 106503255 A * | 3/2017 | | G06F 16/35 |
| WO | WO-2007146973 A2 * | 12/2007 | | G06Q 30/02 |

*Primary Examiner* — Laurie A Ries
(74) *Attorney, Agent, or Firm* — Richard T. Black; FisherBroyles, LLP (57) ABSTRACT

This invention relates to marketing and creation of digital content (text, voice, video, imagery, etc.) and understanding what topics are most relevant for an intended audience, its size, the type of content that audience wants to consume, and the optimal distribution method (social media, email, podcasts, voice assistants, web pages, mobile apps, etc.), and leveraging machine learning to automatically create content with a high chance of success.

8 Claims, 9 Drawing Sheets

(56) References Cited

U.S. PATENT DOCUMENTS

| | | | |
|---|---|---|---|
| 2012/0109777 A1* | 5/2012 | Lipsitz | G06Q 30/0621 705/26.5 |
| 2012/0278300 A1* | 11/2012 | Soubbotin | G06F 16/338 707/706 |
| 2013/0054424 A1* | 2/2013 | Chen | G06Q 30/00 705/27.1 |
| 2013/0144605 A1 | 6/2013 | Brager et al. | |
| 2014/0019443 A1 | 1/2014 | Golshan | |
| 2014/0046894 A1* | 2/2014 | Bradley | G06Q 10/06 706/52 |
| 2014/0188681 A1* | 7/2014 | Shahghasemi | G06Q 20/384 705/37 |
| 2014/0278834 A1* | 9/2014 | Lautz | G06Q 30/0245 705/12 |
| 2014/0365507 A1* | 12/2014 | Wissner | G06F 16/972 707/748 |
| 2015/0012514 A1 | 1/2015 | Yan et al. | |
| 2015/0039107 A1* | 2/2015 | Tocci | G06Q 10/0639 700/93 |
| 2015/0046254 A1* | 2/2015 | Raab | G06Q 30/0273 705/14.47 |
| 2015/0081661 A1* | 3/2015 | White | G06F 16/24578 707/723 |
| 2015/0106078 A1 | 4/2015 | Chang | |
| 2015/0112787 A1* | 4/2015 | Fricke | G06Q 50/01 705/14.27 |
| 2015/0120502 A1* | 4/2015 | Jung | G06Q 30/0613 705/26.41 |
| 2015/0261773 A1 | 9/2015 | Walid et al. | |
| 2015/0265931 A1* | 9/2015 | Himelstein | A63F 13/828 463/31 |
| 2015/0269153 A1* | 9/2015 | Fink | G06F 16/24578 707/750 |
| 2015/0339573 A1* | 11/2015 | Flinn | G06F 40/30 706/12 |
| 2015/0347467 A1* | 12/2015 | Basson | G06F 16/355 707/769 |
| 2016/0048598 A1 | 2/2016 | Fujioka et al. | |
| 2016/0147713 A1 | 5/2016 | Ni et al. | |
| 2016/0306878 A1* | 10/2016 | Palmert | G06F 16/345 |
| 2017/0201779 A1 | 7/2017 | Publicover et al. | |
| 2017/0235848 A1* | 8/2017 | Van Dusen | G06Q 10/101 705/12 |
| 2017/0300477 A1 | 10/2017 | Long et al. | |
| 2018/0071581 A1* | 3/2018 | Chang | G06Q 30/0241 |
| 2018/0161680 A1 | 6/2018 | Thompson et al. | |
| 2018/0300406 A1 | 10/2018 | LaRowe | |
| 2018/0349793 A1 | 12/2018 | Triolo et al. | |
| 2019/0034976 A1* | 1/2019 | Hamedi | G06Q 30/0243 |
| 2019/0114298 A1 | 4/2019 | Archarya et al. | |
| 2019/0180338 A1* | 6/2019 | Swanson | G06Q 30/0603 |
| 2019/0197599 A1 | 6/2019 | Zia et al. | |
| 2019/0244222 A1 | 8/2019 | Rathod | |
| 2019/0361987 A1 | 11/2019 | Qiao et al. | |

* cited by examiner

March Madness Hub Page: Competitive Opportunities by Topic
302

| Hide Generic/Uncategorized | Yes ▼ | Brand | (All) ▼ |
|---|---|---|---|
| # of words in a keyword phrase | (All) ▼ | Hide Hero Sports | (All) ▼ |
| Page 1 | Yes ▼ | Listing Type | (All) ▼ |
| Page 2 | (All) ▼ | | |

| Categories (306) | Average of Blended Rank (305) | Count of Keyword (306) | Sum of Search Volume (307) | Average of Trust Flow (Exact URL) (308) | Sum of Referring Domains (Exact URL) (309) | Average of Trust Flow (Exact URL) (310) | Sum of Referring EDU Domains (Domain) (311) |
|---|---|---|---|---|---|---|---|
| ± Schedules & Dates | 32 | 75 | 96,600 | 7 | 1,291 | 40 | 5,442,985 |
| ± When does it Start? | 32 | 25 | 57,820 | 7 | 381 | 42 | 620,138 |
| ± Dates, Projections, Teams, Etc. | 60 | 4 | 54,270 | 22 | 280 | 73 | 163,720 |
| ± Bracketology | 49 | 116 | 53,690 | 1 | 237 | 21 | 745,970 |
| ± Predictions | 39 | 39 | 19,540 | 1 | 47 | 19 | 164,721 |
| ± Finals or Final Four | 57 | 47 | 17,670 | 3 | 446 | 26 | 381,040 |
| ± Who Questions | 36 | 12 | 7,160 | 0 | 12 | 18 | 28,920 |
| ± TV Schedules | 31 | 9 | 6,560 | 0 | 14 | 17 | 23,255 |
| ± Locations | 29 | 21 | 5,280 | 7 | 444 | 45 | 466,850 |
| ± Odds | 23 | 21 | 4,630 | 0 | 21 | 18 | 50,610 |
| ± Women's March Madness | 37 | 15 | 4,330 | 0 | 16 | 18 | 36,150 |
| ± NCAA Tournament | 46 | 26 | 3,670 | 10 | 426 | 41 | 684,089 |
| ± Results | 51 | 18 | 3,390 | 0 | 18 | 18 | 43,380 |
| ± Teams | 55 | 32 | 3,390 | 2 | 48 | 21 | 218,582 |
| ± Winners (Past and Present) | 41 | 32 | 3,260 | 2 | 239 | 23 | 192,680 |
| ± What is March Madness? | 41 | 2 | 2,950 | 6 | 29 | 44 | 42,405 |
| ± TV | 41 | 2 | 2,910 | 0 | 3 | 18 | 5,155 |
| ± Picks | 54 | 17 | 2,620 | 0 | 17 | 18 | 40,970 |
| ± Biggest Upsets | 54 | 10 | 2,620 | 0 | 10 | 18 | 24,100 |
| ± Betting or Betting Lines | 62 | 11 | 2,120 | 0 | 11 | 18 | 26,510 |

*Fig. 3*

Rankings Matrix Tool — 402

| | | |
|---|---|---|
| Page 2 KW's for Hero Sports (All) | Page 1 | (All) |
| Page 2 KW's for Hero Sports that Competitor (All) | Page 2 | (All) |
| Hide Generic/Uncategorized Yes | Listing Type | (All) |
| # of words in keyword phrase (All) | | |

Note: Value of 100 means "Not Ranking" or – on average – Not ranking well in that particular category. 412 413

| Categories — 404 | 405 — Count of Keyword | Sum of Search Volume | Average of Trust Flow (Exact URL) 407 | HERO Sports Avg. Rank 408 | ESPN Ave. Rank | NCAA Avg. Rank 409 | SI Avg. Rank 410 | Wikipedia Ave. Rank 411 | Print Your Brackets Avg. Rank |
|---|---|---|---|---|---|---|---|---|---|
| + Schedules & Dates | 75 | 96,600 | 7 | 70 | 83 | 54 | 100 | 94 | 83 |
| + When does it Start? | 25 | 57,820 | 7 | 63 | 86 | 53 | 94 | 100 | 100 |
| + Dates, Projections, Teams, Etc. | 4 | 54,270 | 22 | 100 | 100 | 60 | 100 | 100 | 100 |
| + Bracketology | 116 | 53,690 | 1 | 54 | 100 | 96 | 95 | 100 | 100 |
| + Predictions | 39 | 19,540 | 1 | 40 | 100 | 100 | 95 | 100 | 100 |
| + Finals or Final Four | 47 | 17,670 | 3 | 63 | 100 | 88 | 100 | 100 | 100 |
| + Who Questions | 12 | 7,160 | 0 | 36 | 100 | 100 | 100 | 100 | 100 |
| + TV Schedules | 9 | 6,560 | 0 | 79 | 100 | 100 | 100 | 100 | 53 |
| + Locations | 21 | 5,280 | 7 | 58 | 100 | 49 | 100 | 100 | 100 |
| + Odds | 21 | 4,630 | 0 | 23 | 100 | 100 | 100 | 100 | 100 |
| + Women's March Madness | 15 | 4,330 | 0 | 37 | 100 | 100 | 100 | 100 | 100 |
| + NCAA Tournament | 26 | 3,670 | 10 | 73 | 100 | 72 | 92 | 100 | 87 |
| + Results | 18 | 3,390 | 0 | 51 | 100 | 100 | 100 | 100 | 100 |
| + Teams | 32 | 3,390 | 2 | 60 | 100 | 100 | 95 | 100 | 100 |
| + Winners (Past and Present) | 32 | 3,260 | 2 | 46 | 100 | 90 | 100 | 100 | 100 |
| + What is March Madness? | 2 | 2,950 | 6 | 87 | 100 | 100 | 100 | 100 | 100 |
| + TV | 2 | 2,910 | 0 | 86 | 100 | 100 | 100 | 100 | 55 |
| + Picks | 17 | 2,620 | 0 | 54 | 100 | 100 | 100 | 100 | 100 |
| + Biggest Upsets | 10 | 2,620 | 0 | 54 | 100 | 100 | 100 | 100 | 100 |
| + Betting or Betting Lines | 11 | 2,120 | 0 | 62 | 100 | 100 | 100 | 100 | 100 |
| + Championships | 7 | 1,740 | 9 | 88 | 100 | 73 | 100 | 100 | 100 |
| + Game Times | 3 | 1,100 | 0 | 79 | 100 | 100 | 100 | 100 | 77 |
| + Rankings | 3 | 1,070 | 0 | 42 | 100 | 100 | 100 | 100 | 100 |
| + Previous Year Searches | 14 | 940 | 13 | 100 | 100 | 34 | 100 | 100 | 97 |
| + Projections | 7 | 950 | 12 | 41 | 100 | 100 | 20 | 100 | 83 |

*Fig. 4*

Gonzaga vs Ohio State Preview: Odds, Predictions, TV, Starting Lineups 3/17/18 March Madness

Everything you need to know for No. 4 Gonzaga vs No. 5 Ohio State

Share

*Fig. 5*

LAST GAME'S STARTING LINEUPS

These were the starting lineups from each team's last game.

| GONZAGA | OHIO STATE |
|---|---|
| Shias Mahan (G) | C. J. Jackson (G) |
| Zach Novell Jr (G) | Kam William (G) |
| Josh Perkins (G) | Keith Baters-Otop (F) |
| Kitten Tilia (F) | Sean T. Tator (F) |
| Jonathan Williams (F) | Kaleo Weston (F) |

*Fig. 6*

| | | |
|---|---|---|
| | SEASON AVERAGES — 701 | |
|  702 | 703 |  |
| 35 | GP | 33 |
| 85.0 | PPG | 75.9 |
| 39.9 | REB | 36.6 |
| 11.6 — 704 | OREB | 9.5 |
| 28.3 | DREB | 27.1 |
| 15.8 | AST | 14.7 |
| 3.8 | BLK | 3.8 |
| 6.6 | STL | 6.0 |
| 11.4 | TOPG | 11.9 |
| 49.9 | FGP | 48.7 |
| 36.4 | 3PTP | 35.4 |
| 72.5 | FTP | 72.9 |

GAME RECAPS

Search  NFL  NBA  BASEBALL  NASCAR   RANKINGS   SPC

GAME SUMMARY — 802

|  | 1ˢᵀ PERIOD | 2ᴺᴰ PERIOD | 3ᴿᴰ PERIOD | 4ᵀᴴ PERIOD | TOTAL |
|---|---|---|---|---|---|
| ARKANSAS | 13 | 24 | 29 | 22 | 58 |
| VANDERBILT | 20 | 12 | 25 | 19 | 76 |

— 803

805

Vanderbilt lost by 12 to Arkansas in Wednesday's game, 88 to 76. Vanderbilt was up by 7 coming into the second half, 20-33.

Arkansas's Keenan Williams scores a team-high 25 points in the win, hitting 11 of 13 attempts collected 25 points, 10 rebounds, 2 steals, and 1 block with 2 turnovers. Christa Reed led Vanderbilt's team in scoring with 16 points, while shooting 40% from the field (making 4 of 10 attempts). In 29 minutes, Reed added 16 points, 9 rebounds, 2 assists, and 1 three with 3 turnovers.

806

POINTS SUMMARY — 807

Vanderbilt scored 25 consecutive points with 50 seconds lift in the 4ᵗʰ Quarter, making the game 88-76 in favor of Arkansas.

*Fig. 8*

② 901 DAILY RANKINGS UPDATE

▽HERO [Search] 🔍 NFL NBA BASEBALL NASCAR RANKINGS SPC

BIGGEST MOVERS ╲
902

Below are today's biggest movers

903

Cal State San Mateo

Walsh Cavaliers

Colorado Springs Mountain Lions

Share

| 153 to 126 | 15 to 95 | 64 to 45 |
|---|---|---|

Cal State San Mateo surpasses Walsh Cavaliers with the biggest leap since the season began. They started the season ranked 55th with the biggest leap over the Walsh Cavaliers and the Colorado Springs Mountain Lions. Cal State San Mateo surpasses Walsh Cavaliers with the biggest leap since the season began. They started the season ranked 55th with the biggest leap over the Walsh Cavaliers and the Colorado Springs Mountain Lions.

904

New York Institute Of Technology BEARS

Metro State Roadrunners

Pace Setters

| 116 to 123 | 80 to 118 | 133 to 154 |
|---|---|---|

New York Institute Of Technology suffered the largest fall today dropping 96 spots from 116th to 154th and will by tonight ship against Metro State. Pace Setters drops down in rankings making a change of 38 places. Pace Setters drops down in rankings making a change of 38 places.

*Fig. 9*

CONTENT OPPORTUNITY SCORING AND AUTOMATION

FIELD OF THE INVENTION

This invention relates generally the marketing and creation of digital content (text, voice, video, imagery, etc.) and, more specifically, to the need to understand what topics are most relevant for an audience you are trying to reach, the size of that audience, the type of content (image, video, text, voice, etc.) the audience wants to consume it, and the distribution method for consumption (social media, email, podcasts, voice assistants, web pages, mobile apps, etc.), and then leveraging machine learning to automatically create this content.

BACKGROUND OF THE INVENTION

Content is used to inform, market, transact, and differentiate. However, content production is still extremely manual, hence time-consuming and thus prohibitively expensive. Moreover, much content that is created is not effective or efficient at informing, marketing, transacted, and differentiating. Automated systems are needed to solve these problems.

There is over 2.7 Zetabytes of digital data and content, 90% of which has been produced in the last 2 years. In 60 seconds of online activity 500 hours of YouTube® video is uploaded, 150,000 emails are sent, 3.3 million Facebook® posts are written, 3.8 million Google® searches are performed, 66,000 Instagram® photos are uploaded, 450,000 tweets are sent, 1440 Wordpress posts are drafted, and 29,000,000 WhatsApp messages are sent.

The following eighteen (18) paragraphs are intended to describe features of one or more embodiments of the invention and are expressly not intended to describe the background of, or any aspect of the prior art with respect to, any embodiment of the invention.

The sheer amount of information online presents a problem for advertisers and content creators. Namely, how can you get noticed amongst the fray? The present invention flips this "problem" on its head; instead of simply wading into the fray with more material, the present invention takes advantage of the sheer amount of data available in order to identify and create opportunities and then generate more effective content based on those opportunities. This allows efficient content creation that is optimized to receive the maximum amount of traffic.

In accordance with some examples of the invention, the process flow may be comprised of the following exemplary steps: (1) Identify topics, (2) leverage the HERO Sports platform to analyze search activity—KWs being searched in Google, Bing, Yahoo, etc., (3) Use machine learning to look at competition inputs such as Domain Authority, Trust Flow, Backlinks, Cost Per Click data, etc. to identify best opportunity (traffic), (4) Identify data set available in warehouse, (5) Deploy natural language generation to normalize data in the database to write optimized narrative, (6) publish content. In various embodiments the steps of the described method may be in a different order depending on the needs of the system, available data, etc.

Identifying topics is accomplished in a variety of ways. It is often driven by business objectives, editorial needs or exploratory keyword research in search engine marketing (SEM) platforms. For example, a business objective may drive the need for increased visibility in search engines for a specific topic that will help increase awareness, demand or online transactions around a particular brand or product. For a publisher, seasonal trends and/or editorial calendar needs may dictate which topics to target in order to increase traffic to a website. Lastly, keyword research in an SEM platform or tool may reveal topical patterns in search engines that, competitively, may be of interest to a business (i.e., an E-Commerce website) or publisher (i.e., a news media website).

Leverage platform to analyze search activity. For instance look at keywords or queries being typed into google, their respective search volume, what companies and websites rank on the Search Engine Results page, Cost Per Click data and seasonal trends to identify which queries companies and websites should "write" content for to increase traffic, revenue or other goals.

Use ML to identify best opportunity to maximize traffic. The ML platform blends SEM data from various APIs (i.e., SEMRush and Ahrefs) to gather the relative search interest and level of competition for a particular set of topics.

An algorithm can be utilized to assess the size of the opportunity for each topic relative to a website's present authority in search engines. The platform generates content recommendations that include delivery format suggestions (i.e., article, podcast, social media campaign, auto-generated post, etc.). Based on the results of the algorithm, all topics are sorted in descending order by level of impact for the client. Next, the platform estimates the density of traffic that a client's web site is likely to receive once content recommendations are applied. Post-launch, the ML platform monitors performance of applied content via the client's preferred analytics platforms (i.e., Google Analytics and Google Search Console) over a period of time. It measures actual traffic, rankings and clicks against estimated traffic. Based on this comparison data, the ML platform may refine content recommendations and reassess the opportunity score for each topic.

The present invention may also include automated keyword research and categorization. For example, according to this embodiment, every keyword can have an opportunity score that allows one to capitalize on the most relevant keywords for a particular business. The categorization+opportunity score ties the current structure to the most relevant pages. Once ties, for example, the foundational pages can be optimize with the researched keywords. For any keyword gaps in content, for example keywords that a client should be targeting, but has no pages to target yet, automated content can be created to fill the keyword gaps. The present invention can incorporate keywords into the title, summary, body and metadata based on the SEO recommendation engine.

The present invention, in a preferred embodiment, utilizes natural language generation (NLG) to write an optimized narrative. According to various embodiments, in order to accomplish this, first the platform analyzes the most important trends, statistics and insights from a dataset, or multiple datasets. After data analysis, the platform pulls real-world situations (milestones, events, statistical analysis) from a proprietary library database. SEO analysis and contextual updates are then added to optimize the article's keyword content. Then the platform creates content modules that makeup unique articles. Example modules of an article include, but are not limited to, titles, subtitles, metadata (title tag and meta description), body text, images, graphs, tables, etc.

The present invention, in a preferred embodiment, utilizes automated drafting. According to various embodiments, this involves pulling from a data warehouse, and organizing it into a narrative data model. In alternative embodiments, narrative writers take that narrative data model and manually create content (titles, subtitles, metadata, body text, images, etc.), using custom tokens and triggers that can be used for multiple narratives.

Content is published through an API to users. Users may require authentication in order to access various content. For example, authenticated users may access the API and program into his or her website, application, tool, etc. The platform according to the present invention may also include functionality to add new customers and employees as users. Users can be tied to organizations and have specific access levels, allowing employees access to different parts of the portal than clients, for example.

Once an article or content is complete, additional grammar and editorial checks (Ex. AP Style, data correctness) can be made to insure the article is correct, and adheres to journalistic principles.

In accordance with other examples of the invention, the present invention provides a method and system for content production.

In accordance with still further examples of the invention, raw data of various forms is converted into content used by companies to inform, educate, or sell.

In accordance with yet another example of the invention, algorithms of the present invention help identify what topics are trending and what topics to write about.

In accordance with further examples of the invention, content is not limited to pure text. For example, content created according to the present invention may include polls, comparisons, and data visualizations.

In accordance with still further examples of the invention, the present invention can create numerous types of content, for example, but not limited to, coaches net worth, player of the week campaign, player profiles, player comparisons, team profiles, team comparisons, game recaps, game previews, and rankings posts.

In accordance with additional examples of the invention, the present can create content for non-sports industries, for example, real estate postings, neighborhood profiles and comparisons, listing rankings and comparisons by home type and location, county or city profiles, selling considerations etc.

These and other examples of the invention will be described in further detail below.

BRIEF DESCRIPTION OF THE DRAWINGS

Preferred and alternative examples of the present invention are described in detail below with reference to the following drawings:

FIG. 4 is a ranking matrix chart according to an embodiment of the present invention;

Elements in the figures are illustrated for simplicity and clarity and have not necessarily been rendered according to any particular sequence or embodiment. For example, features may exist concurrently or in a different orientations and are illustrated in the figures to help improve the understanding of the embodiments of the present invention.

DETAILED DESCRIPTION OF THE PREFERRED EMBODIMENT

The present invention provides an automated content generation system that collects and stores data, reviews the data and determines opportunities for content, and then drafts and publishes content consistent with the identified opportunity.

Figure 1:
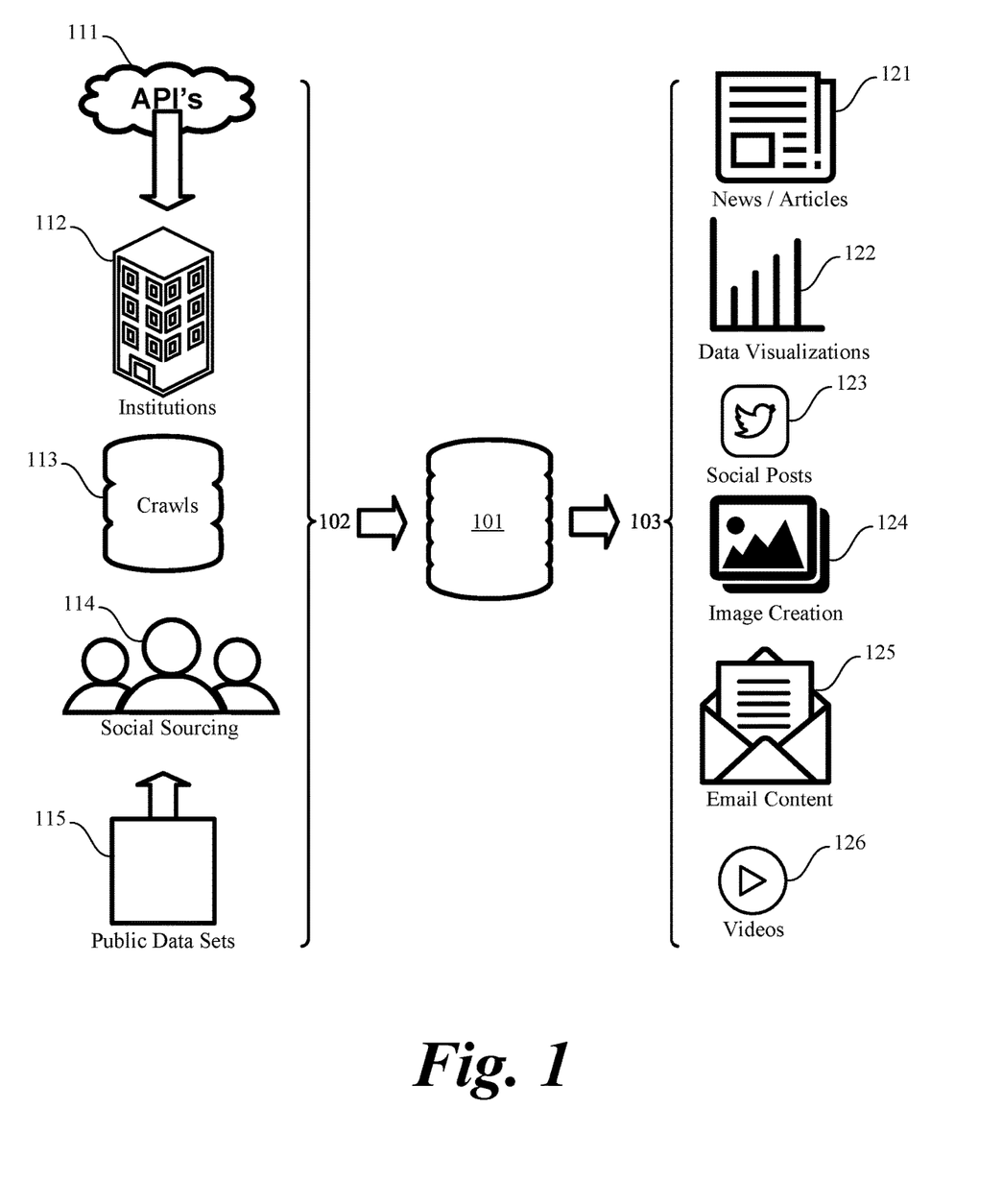
FIG. 1 is a flowchart of a system for creating content according to an embodiment of the present invention.

FIG. 1. provides an illustrative view of a system according to the present invention. As shown, the system 101, utilizes a series of inputs, 102 to generate any number of types of content 103. The individual components of the system that allow it to generate content 103 using data and inputs 102 are described more specifically herein. Examples of data and inputs to the system 101 include APIs 111, institutional data 112, data from crawlers 113, data from social media and other publically available websites 114, and public data sets 115. These are simply some examples of the data sets that go into the data warehouse, a component of the system 101. For example, the present invention can identify target keywords or topics. Targeting key words or targets informs the user, or client, of areas of interest. This content recommendation is preferably automated. Various embodiments utilize API's, institutions, crawlers, social sourcing, and public data sets in order to identify keywords or topics.

The present invention may review the available data and produce useful information for the client. Types of content include news or articles 121, data visualizations 122, social media posts 123, image creation 124, email content 125, and videos 126, or combinations of the forgoing. This useful information can include competitive gaps that exist in the current market or vertical a company's business operates within. In addition, the present invention may provide ordinal scores outlining what content to create and prioritize based on a business' need with corresponding opportunities to increase traffic or revenue. For example, the present invention may analyze publicly available data in order to determine what sports story to run. The analysis would produce results that would suggest the type and content of the content in order to maximize traffic and/or revenue.

More specifically, the present invention may review publicly available information and determine that there are many existing articles covering topic A from viewpoint X, but, there are fewer articles on topic A from viewpoint Y. Additionally, by reviewing other publicly available information such as Twitter, Facebook, Instagram, and other sources, the present invention is able to determine that content consumers would prefer viewpoint Y. This information is then used to determine that an opportunity exists to produce content in this less populated market thereby increasing traffic and revenue opportunities and not wasting resources producing content into overcrowded areas.

The present invention may also tap Google for competitive discovery to identify seed sites. These seed sites refer to top 10 or 20 organic listings for a keyword or topic in Google's live SERPs. In various alternatives, the present invention may use SEMRush's or other search technologies organic competitors' data to identify top 10, 20 or 100 organic listings from their API, which can in turn be used as a robust list of seed sites. Further, the client site may be included in the data pull to help the platform accurately assess its average level of authority versus the competitive landscape for a keyword or topic in Google's SERPs. Additional data sources, when available, may include MySQL, GSC or Google Analytics.

A schema may be created within the MySQL and SEMRush data, to perform searches to the Core pages. Preferably, the data stream between Google search Console and MySQL is automated. In a similar way, preferably the stream between Google Search Console and SEMRush is automated. Accordingly, the present invention builds a massive library of search data that can be mined for internal or client-facing engagements.

In various embodiments, additional scripts may be used to pull and import GSC data into MySQL. The frequency of this pull and import may be daily, weekly, monthly, or any other time period.

The present invention then creates a list of URLs (Seed List) to call all keywords per URL using a SEMRush API call and PHP script. From this data, the present invention may pull, for example, the top 20 or 100, or any other number, of ranking keywords per URL. Another option according to the present invention uses SEMRush's "Related Keywords" API to backfill data. Related Keywords pull from Google's auto-suggest algorithm.

Once the database is prepared, the present invention may search metrics to pull from SEMRush, for example, by keyword. Metrics to pull may include, for example, position, search volume, competitive density, and CPC (social retweets or shares to measure probably virility of a given topic).

An API may also target crawl/backlink metrics to pull by URL. This can produce the number of referring domains, URL ratings, domain ratings, title tags (proxy for topical category), as well as unique inlinks (which provides how "business critical" the page is to a client or competitor.)

Keyword Suggestions Process may be completely automated. For example, various embodiments of the present invention may include, an intelligent crawler and SEMRush/PHP looper that: (1) Identifies the top organic listing for a particular keyword/topic; Crawls the homepage HTML of this organic competitor's Top Nav container (i.e., their Homepage Menu), which in turn (2) extracts site category names and corresponding URLs; (3) Pulls ranking keywords-per-URL from the above category URLs in Positions 1-30 (to help ensure relevance) via the SEMRush API; (4) Automatically combines keywords, URLs, and applicable categories into a table; (5) Identifies top 5 or top 10 keywords per Category by Search Volume (descending); (6) Executes the URLs-per-KW API script to extract the top organic listing for each of the top keywords identified in step 5; (7) Pulls ranking KWs-per-URL for each of the top organic listings in Positions 1-20 identified in step 6. Imports newly discovered keywords back into the master table and VLOOKUPs category names.

An additional option, utilizing the teaching of the present invention, utilizes a Keyword Suggestions Process Using Known Competitors. This process, for example, utilizes the same-exact steps delineated above, except: is tailored to each client's business based on primary and secondary research conducted by HERO Sports, answers obtained from discussions with the client to identify who they believe their competitors are Google's listings are agnostic to this, i.e., Wikipedia ranks higher than an actual competitor; or Manually identify the client's top 5 competitors in Google outside of informational aggregator sites, such Wikipedia or Bankrate (finance industry). Once competitors are identified, run the above automation process against their Homepage HTML menus. This can help ensure that the client gets palatable and familiar categories relevant to their business.

The foregoing keyword research produces a dataset. This dataset may be stored locally, or in the cloud. In various embodiments of the present invention, the database may be continuously updated with temporally relevant information. In other embodiments, various instances of a database may be stores, and the delta of one or more databases may be used to determine the shift in content optimization over time.

Figure 2:
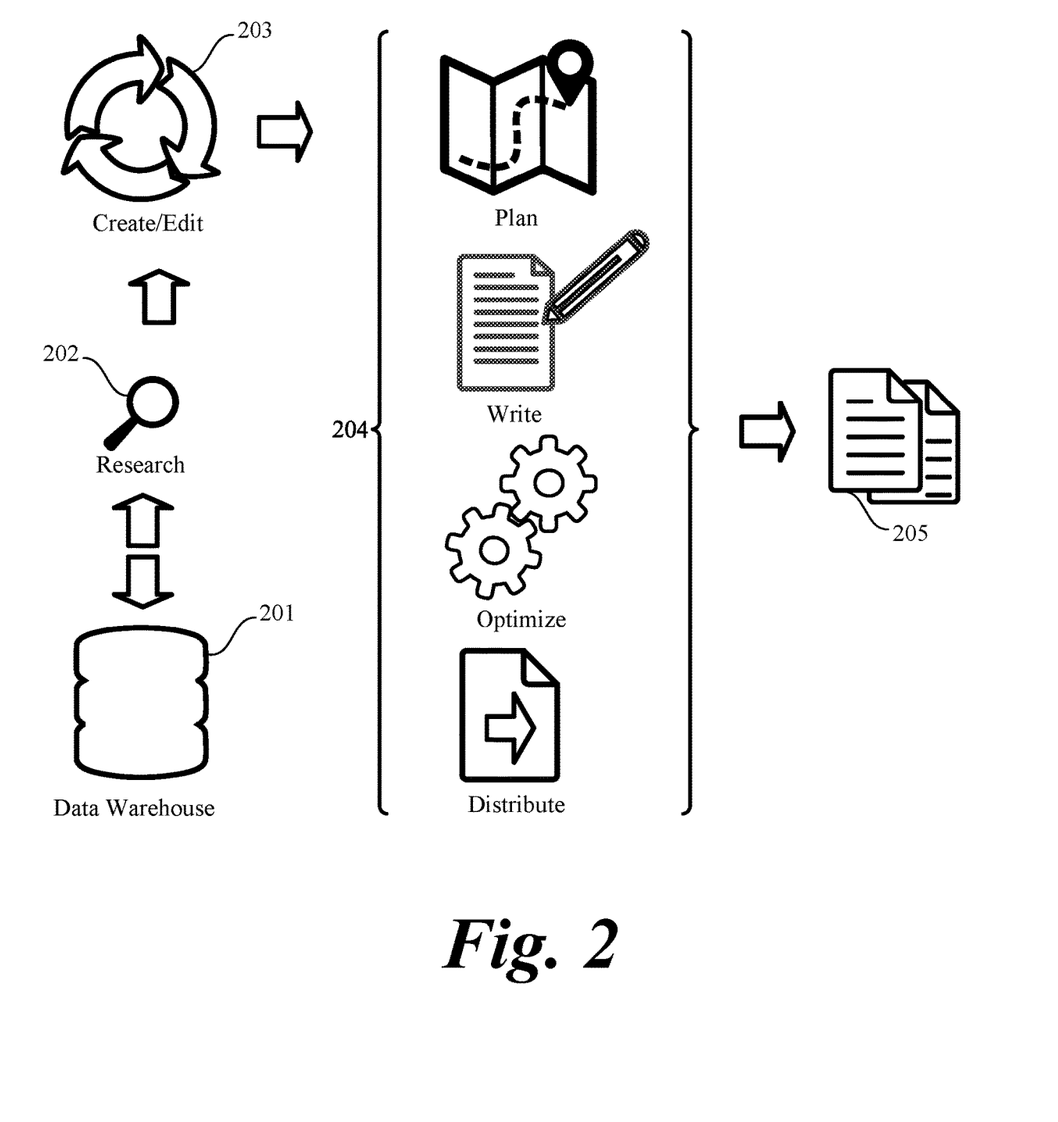
FIG. 2 is a flowchart of a system for creating content according to an embodiment of the present invention.

FIG. 2 provides an illustration of a sequence according to an embodiment of a system according to the present invention. The data warehouse 201 stores information for use by the system to create 203 content 205. The data warehouse 201 is in connection with the internet, and uses various programs to constantly look for information and update existing information. This information is used to create or edit content according to the content plan 204. Once data is collected, it is written and optimized according to a particular distribution method and or content type. Once optimized, the final product 205 is produced.

When preparing the database 201, according to various embodiments of the present invention, useful column headers may include: keyword, category (semi-manual), hide/generic/uncategorized, rankings matrix (vs all competitors, including the client an example function being average rankings per brand=IFERROR(AVERAGEIFS($L:$L,$B:$B,B5,$V: $V, "Hero Sports"),100)), number of keywords per phrase, position, one or more keywords filters, search volume, page, referring domains, URL rating, domain rating, brand, client filter (does the ranking page belong to a client?).

In additional embodiments, additional scripts may be used, in an automated manner, for SEMRush APIs to provide more robust filters. For example, an embodiment of the present invention may exclude or include filters for: keyword modifiers (single or array), may include additional operators, AND OR for example, positional ranges (i.e. keywords between 1-20 in Google). Various other examples are of course possible depending on the needs of the individual project.

Various embodiments of the present invention utilize a data warehouse 201. The data warehouse is a collection of data from various sources, and can include both client data and publicly available datasets. Publicly available datasets can come from open source or paid APIs or through crawling various websites. The data warehouse can be used, for example, to produce client-facing pivot tables and charts. For example, these client facing products can include where the primary dimension=category. Further, in various embodiments, the corresponding metrics may include, for example but not limited to, average position, number of keywords, search volume sum or average, average URL rating (per topic), sum or average of referring domains. Various other metrics may be included as needed. A INarratable and IAsset Engine can collect input from users which tell the platform what data it needs. Different data sets are dynamically returned per a client's narrative requirements.

Figure 3:
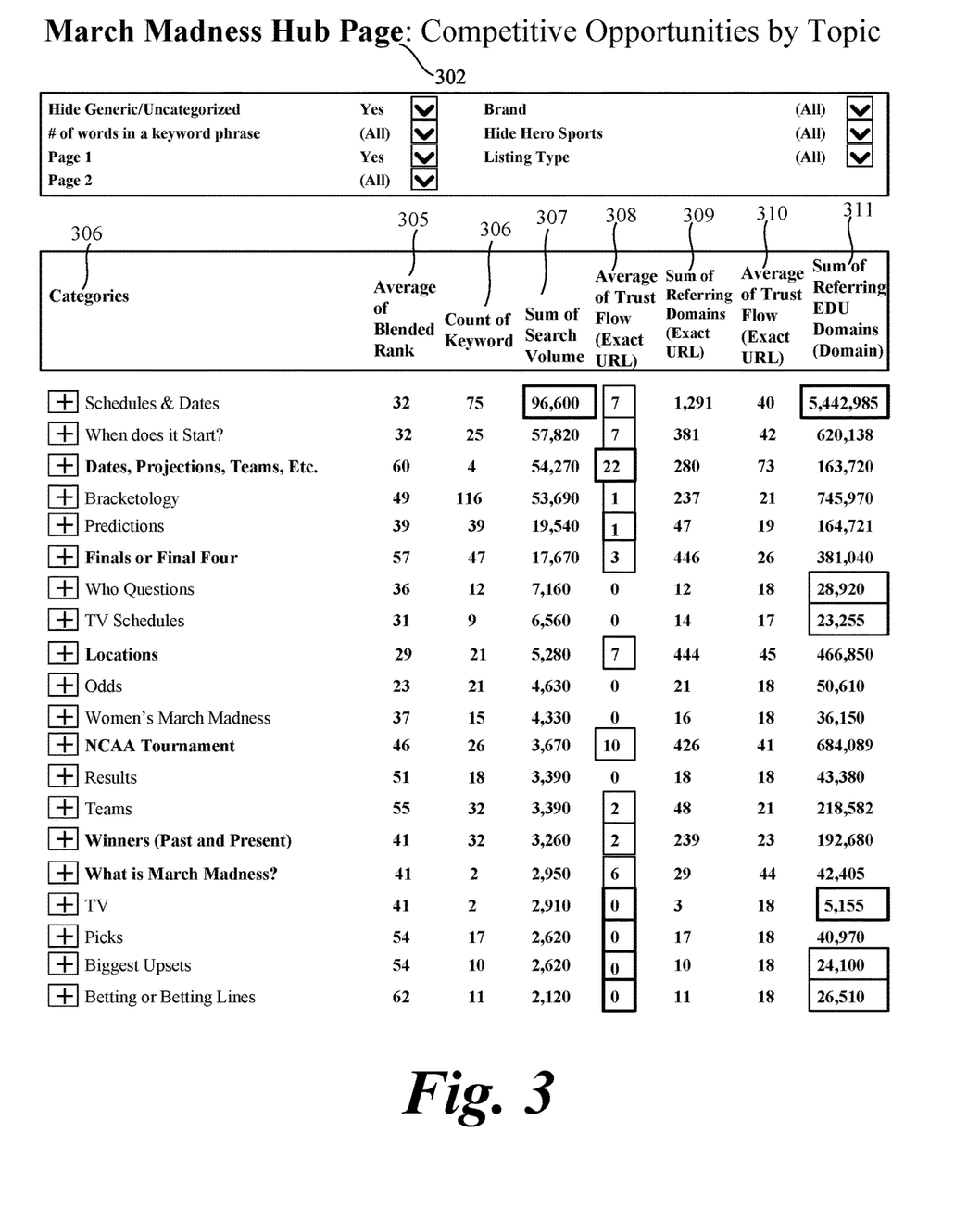
FIG. 3 is a chart according to an embodiment of the present invention.

FIG. 3 provides an example topical matrix of SEM metrics identifying competitive opportunities according to an embodiment of the present invention, including the average positional rank, search volume (or search interest), and backlink metrics for a list of sub-topics related to March Madness. In theory, if a sub-topic drives relatively high search volume, attracts relatively low referring domains, and a relatively low URL rating, it presents a strong opportunity for the client's website to rank in search engines. Ranking needs or deltas provide opportunities to increase traffic or revenue for articles.

In certain embodiments, the rankings matrix may be appended, for example, by category. According to this example, the present invention may provide the client's average ranking per category, as well as competitor's average ranking for category. Any number of competitors may be included, for example, using the present invention, a client can easily compare their own rankings to competitors 1, 2, 3, 4, etc. on a per category basis. A level of interest can also be calculated, for example by crawling social media, data trends, and other available information to determine a level of interest for any given topic. In many embodiments, a level of interest is determined for numerous topics, and the level can be updated periodically. This allows the system to dynamically keep up with trends, and provide the most relevant data for system decision. The level of interest is used to identify an area of competitiveness or difficulty. For example, topic A may have a high level of interest based off available data, but, at the same time, topic A also has many articles written about it. As a result, were the system to pick topic A, it would be challenging to achieve much success, given the high level of competitiveness in topic A. In order to produce the content with the highest chance of success, the present system also keeps track of competitiveness for various topics, by comparing the level of interest and the competitiveness, the present system is able to determine the size of opportunity for any given topic.

Various embodiments of the present invention allow for weighted criteria for recommendations, for example, by category. These criteria can include, relatively high search volume (search appetite), relatively low URL rating, and or referring domains (competitive difficulty), relatively low average rank that retains "ranking relevance" (for example, relevance=position 1-30 or 1-20 etc.), hide uncategorized/generic filter. Using these criteria, the present invention is able to zero in on, or triangulates, on an opportunity based weighted algorithm that reconciles, for example, (1) relatively high search volume (search appetite), (2) relatively low URL rating, and or referring domains (competitive difficulty), (3) relatively low average rank that retains "ranking relevance" (for example, relevance=position 1-30 or 1-20 etc.). This outcome of this algorithm provides the user with an opportunity where high level of interest and lower competitive difficulty converge. Armed with this information, the present invention allows users to produce content that is more likely to succeed, more clicks, revenue, etc.

As depicted the competitive opportunities matrix includes a number of columns. Categories 304 categorizes all the topics uncovered through analysis into groups/sub topics. Average Blended Rank 305 informs the user, for said category, what is the average position in search engines when people make a query (Ex. Type a query into google, what is the average rank for a given webpage for that query). Count of Keyword 306 informs the user how many keywords (queries) comprise the category. Sum of Search Volume 307 provides a metric search engines use to understand how many queries are made, on average, per month (Ex. Tom Brady is queried on average 1,500,000 per month in google). Average Trust Flow 308 (Exact URL) is a measure from 1-100 of how credible or authoritative a web page (URL) in the eyes of search engines. For Ex. ESPN-.com/mlb would be high, whereas bradweitzsports/mlb would be low. Sum of referring domains 309 (Exact URL) is the number of websites that link to a specific webpage. Average Trust Flow (Domain) 310 is a measure from 1-100 a how credible or authoritative a website is. EX. ESPN.com would be high, bradweitzsports.com would be low. Summary of EDU domains 311 is a count of the number domains that have .edu as an extension that link back to a website.

Embodiments of the present invention may tap Google for competitive discovery to identify seed sites, for example. Alternatively, the present invention may utilize the SEMRush top organiz competitors' data to identify seed sites. Seed sites refers to the top 10 or 20 organix listing for any given keyword topic in Google's live SERPs. Additional data sources may be used for example, client site data pull, MySQL and GSC. A resulting list of URLs (seed list) can be used to call all keywords per URL using SEMRush API call and PHP script. This allows the system to, for example, pull the top 20 or 100 ranking keywords per URL. The invention may also, use SEMRush "related keywords" API to backfill data. Related keywords can pull, for example, from Google's auto-suggest algorithm. Target search metrics to pull from SEMRush (by keyword): Position, Search Volume, Competitive Density, CPC. Other data points that may be useful for the present invention include Social Retweets or Shares (measures probable virality of topic), Target crawl/backlink metrics to pull (by URL)—API: Ahrefs: # of Referring Domains, URL Rating, Domain Rating, Title Tag (proxy for topical category), H1 if possible, Unique inlinks (how "business critical" the page is to a client or competitor).

FIG. 4 provides an example of the Rankings Matrix Tool 402 according to an embodiment of the present invention. Here, the platform provides a table of average positional rankings in Google that can allow a client to compare how well they rank for each topic against their immediate competitors. In theory, if a competitor's average rank for a particular topic is less (i.e., higher) than the competition in Google, then the client is more likely to rank well for that topic should they produce content around that topic on their website.

Using the data warehouse, and ranking matrix, the present invention is then able to, on a completely automated or automatic basis, plan, design and create various posts, articles, etc. that act on, in specific targeted response to, the identified opportunity. Planning can target specific events in advance, and publish articles within an optimal timeline in order to maximize clicks.

As depicted, items 404 through 407 for the ranking matrix tool 402 are the same as 304-307 above. 409-413 columns are illustrating for a given domain (ESPN.com, NCAA.com, etc.) what is the average rank in search engines for each category.

Once the proper plan is created, the present invention drafts the content. This includes all components of the end piece. The system composes, including with photos, videos and other media, the content and optimizes the content for consumption. The system also determines the content type, i.e. news or articles, data visualizations, social media posts, image creation, email content, and/or videos. The functionality of the content is also determined, for example if any audio, video, charts, or images would provide additional functionality or improve the content. Finally, the publication channel is determined. For example, the present invention may, on a completely automated or automatic basis, produce various content types including news or articles, data visualizations or charts, social posts, images, email content, and or videos. These various content types are, of course, not mutually exclusive. For example, a news article may require charts, images, and videos, all combined to create a single piece of content.

The present invention also takes into account search engine optimization in its title structure, schema, page structure, and word count. For social posts, character count, tagging, image type and links are also automatically populated. For email content, the subject line, images, text, video, call to action, etc. are populated. Voice may also be used, for example, transcription, alexa skills (or other voice assistants), podcast searches (deep linking, app optimization).

The present invention may also, also completely automated, determine the necessary content functionality in order to be best received. Types of functionality can include, for example, charts, graphs, or other statistics, social post statistics and or the posts themselves, for example the tweets of influential or relevant individuals, audio content, and or video content. This is done by analyzing market trends for example what people are searching for in google, how many likes, shares, tweets, email opens, etc. are done for each article. HERO Sports' platform then analyzes client web site traffic, podcast data, social marketing data, and business performance metrics such as revenue, website transactions, website traffic and analytics to optimize created content based on audience behavior.

An important component of the present invention is to produce automated content that is indiscernible from manually created content. To that end, the present invention employs various techniques to ensure best journalistic practices are followed, as well as techniques to ensure a natural style.

Upfront QA generates multiple narrative snapshots from past games. This can be hundreds, thousands of games that have occurred in the past. Errors are automatically logged, grammar errors are automatically identified for fixing.

Daily QA includes various analysis and validation steps, for example:
  Internal Process Analysis, which can be composed of various component such as:
    Crawl Validator: Checks that all games have been crawled,
    Narrative Validator: Checks that all expected narratives have been generated,
    Narrative Feed Validator: Checks for blank titles, blank summaries, and blank metadata,
    Rundeck Validator: Processes management and generation process. Analyze when a rundeck/cron job is supposed to kickoff, notify upon success/failure,
    Notification Engine: Restart all processes on failure and send a failure notification notice via multiple outlets (Slack, email, etc.). Send a success message to the QA and development team.
During this process, all items will restart upon failure and attempt to fix themselves with business logic. On error, regenerate the problem narrative/feed and log the error and notify the QA and development team. On secondary error, regenerate the problem narrative, if the problem persists, notify the QA and development team to manually fix. Depending on the client contract requirements, optionally push the feed live or wait until the entire feed is fixed.

Another feature of the DailyQA can include managing Content Quality, which includes checks of:
  Style: The present invention can utilize a library of style guides to check against a narrative's grammar. For example, if an Oxford Comma is used.
  Spelling & Grammar: The present invention can implement an automated spellcheck system as well as a grammar validator.
  Data Checker: The present invention can utilize a data checker to review data to ensure accuracy. Data checker can be broken into two components. (1) Statistical Accuracy: The present invention can compare a commodity database with multiple stat sources to check validity. If there is a discrepancy in data, the present invention will inherit the most consistently reported number and notify the Quality Assurance team to validate the edit. (2) Changelog: The present invention can have an understanding that past data feeds are updated. If partner APIs keep a changelog, the present invention can read all changes, create its own changelog and update the database. If the 3rd party API does not contain a changelog, the present invention can regularly re-crawl the APIs to ensure the most accurate data is used.
  Sentence, Trigger, Paragraph Failure: If a narrative component fails, the present invention can create a list to sort through and validate. For example, if the present invention did not sense a triple-double, it will list that as a failed trigger. It can then run automated checks against the data that reads like, for example, "find a game where triple-double=failed trigger" and ">=1 player has a triple-double". Results can then be analyzed and update any triggers that need edited. All processes will attempt to regenerate the feed until an unbroken narrative is found. On secondary error, regenerate the problem narrative, if the problem persists, the QA and development team can be notified to manually fix. Depending on the client or user request, the narrative can be pushed live or wait until the entire feed is fixed.

The present invention constructs content to read like a human. Some style choices, such as a Compelling Headline, Strong "lead" sentence etc. can be incorporated. This provides a notion of a theme in the content (comeback, blowout, player specific, etc.). In order to create content that reads most naturally, various techniques are employed by the present invention. These include:
  A Reusable trigger library: This trigger library can map out every situation of a sport. Some triggers are reusable from sport-to-sport such as "division rivalry" or "winning streak". Some triggers are sport or client-specific, such as a "triple-double" trigger or "wildcard-clinched" trigger.
  Contextual Understanding: The present invention ranks the importance of any trigger within a library. For example, a ranking may be where a "walk-off home run" is more important to report about than a "hit streak=2 games". These "Trigger Rankings" can allow the present invention to contextually understand the most relevant things about any given game.
  Insight Engine+Unique Ingestion style: The insight engine of the present invention can take data in-context, such as the game at hand, and compare it with past games for insightful data points. For example, if someone has a hit in a game, the present invention takes into account all games that that player has played in the past X games and determine if he or she is on a hitting streak. This allows the present invention to determine and write about things like player milestones, team streaks, career leaderboards, year-over-year player performance, player comparisons, cross-league player comparisons.

News Triggers: News headlines can be based off of a trigger ranking importance and create compelling headlines to handle any possible situation. An example headline could be, "The Mariners win with a walk-off home run from Ken Griffey Jr.". There can be hundreds of other potential options, the present invention decides on the ideal option whenever this news trigger is fired, it is always going to be more important than a "2-game hit streak". This level of specificity not only ensures variation, but also captures the most accurate and important depiction of the game.

Once the content type and functionality is determined, the present invention may also, completely automated, determine which distribution channel is most appropriate given the content of the content. For example, the content may be a news article with embedded video content, the present invention may determine (as explained further below) that a web accessible article may be best by looking at web analytics data such as click-throughs, time on site, bounce rate etc. and comparing it to other versions of content being deployed. In another example, a chart may be created, and the present invention may determine that twitter is the best avenue to produce the most social engagement.

Automated search engine optimization may include—Word Count, Page Structure, Title Structure, Schema, Etc. Automated social media optimization may include—Character count, tagging, links to original article, dynamically adding and tagging specific athletes, Imagery type, links etc. Automated email optimization may include—Subject, Image, Text, Video, CTA, Etc. Automated Voice optimization may include—Transcription, Alexa skill (and others), Podcast Search (Deep linking, App Optimization). One or more of these automated optimizations may be used in order to produce optimized content capable of reaching the most users. For example, utilizing the present invention, the system may determine an opportunity exists in topic A. The present invention may then determine that opportunity would be best acted on using a social media post including text, and images. The present invention then drafts the article, pulls the images, and uses stored analytics to determine the best title, content, location, and timing for the article to publish.

Once prepared, and optionally approved after QC check, content is automatically pushed or published to any channel or medium. Further, the present invention provides for Content Governance. Content Governances ensure that all content you push is tied together and linked and sending the same message.

Figure 5:
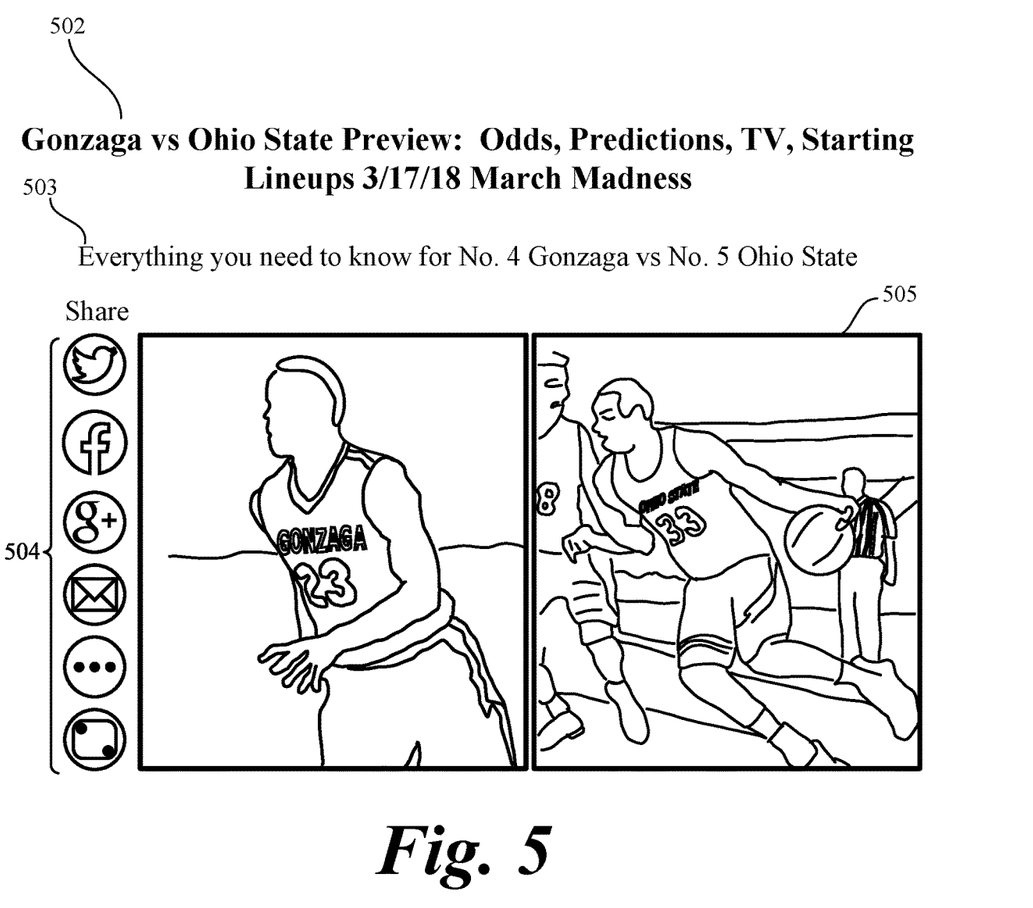
FIG. 5 is an example of a headline according to an embodiment of the present invention.

FIG. 5 depicts an example of an article prepared according to an embodiment of the present invention. Every aspect of the article was prepared without human intervention. As depicted, a Title 502 is automatically generated. The title preferably reads like a naturally generates one and is SEO. Under the title a heading 503 is produced, this heading may appear in search engines and informs the reader as to the contents. The image 505 is pulled from a database and depicts a player from each team. The image 505 is preferably team specific.

Figure 6:
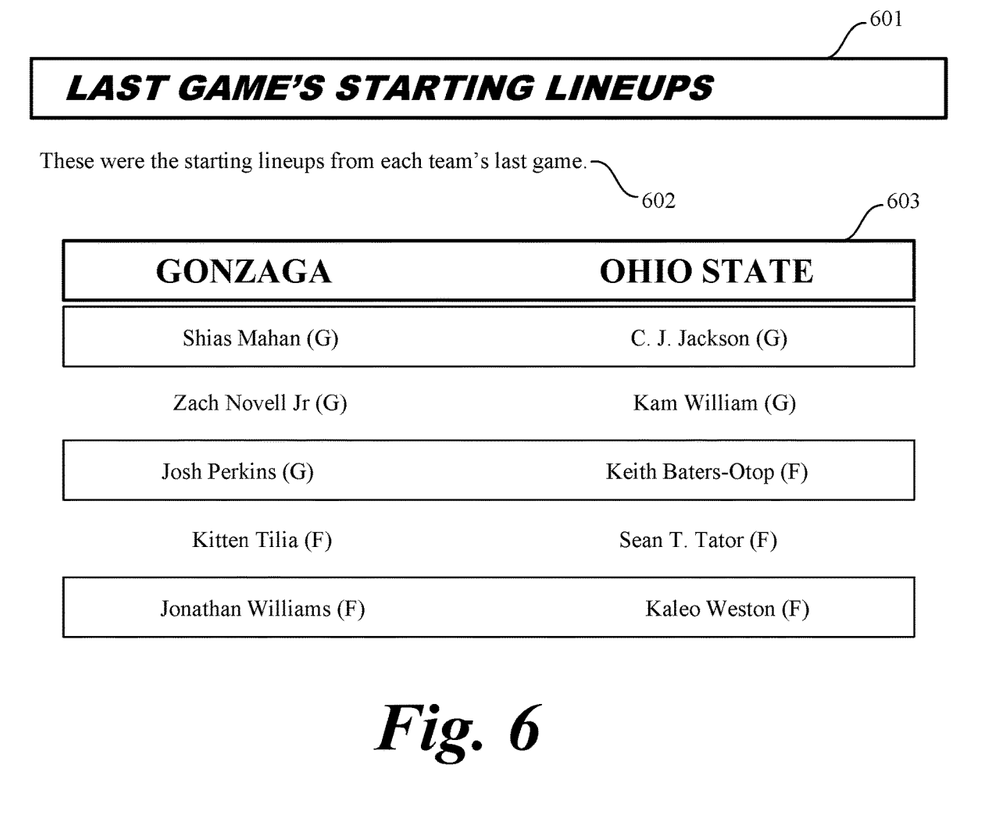
FIG. 6 is an example of content produced by a system according to an embodiment of the present invention.

FIG. 6 depicts content that can be included as part of an article according to an embodiment of the present invention. For example, a Starting lineup 601 may be included. The information 604 to populate table 603 is pulled from the data warehouse. A heading 602 describing the content of the table 603 may also be included. As depicted, the table is broken into columns by team. The players for each team as listed as part of the information 604. Additional information is also provided, such as the players position. In other examples, the players number, scoring average or other information may be added as necessary.

The following text is an example of automatically generated content that accompanied the article of FIGS. 5 and 6, underlined text indicates an automatically generated link to additional content: "Gonzaga (31-4) is scheduled to matchup against Ohio St. (25-8) this Saturday, March 17th. Tip-off is at 7:45 pm ET and the game will be playing live on CBS, streaming available on FuboTV (Free Trial). Gonzaga is the favorite at −3, 84.6% have picked Gonzaga to cover the spread. The over/under for total points scored is 143.5.

GONZAGA GAME SUMMARY Gonzaga won their last game against North Carolina-Greensboro, 68-64 on Thursday, March 15th. Johnathan Williams (Gonzaga) scored a team-high 19 points for the winning team, making 8 of 12 attempts from the field for a 66.7% field goal percentage. In 34 minutes, he collected 19 points, 13 rebounds and 1 assist with 2 turnovers. Demetrius Troy led North Carolina-Greensboro's team in scoring with 16 points, while shooting 8 of 11 (72.7%) from the field. In 28 minutes, Troy added to his stat line, 16 points, 3 rebounds, 2 assists and 1 steal with 4 turnovers.

Ohio St. Game Summary

Ohio State won their last game against South Dakota State, 81-73 on Thursday, March 15th. Ohio State's Keita Bates-Diop led his team to a win with a team-high 24 points. He went 7 for 19 from the field, shooting 36.8%. In 37 minutes, Keita collected 24 points, 12 rebounds, 1 assist, 1 block and 4 threes with 2 turnovers. Although South Dakota State was defeated, Mike Daum fought to keep his team in the game with 27 points, shooting 45% from the field (making 9 of 20 attempts). In 37 minutes, he added 27 points, 6 rebounds, 1 block and 5 threes with 4 turnovers.

Prediction

Gonzaga had more trouble than many expected in the first round and needed a late three-pointer from Zach Norvell to seal the victory. Ohio State got a good fight, too, from 12-seed South Dakota State. This second-round matchup should be a fun one.

Ohio State: 76

Gonzaga: 73

The prediction section provides insight on the last games of each team and generates a score prediction based off of proprietary algorithms. Season averages are dynamically populated in the team comparison table, e.g. as depicted in FIG. 7.

The article described above is an example of a completely automated article, without any choosing the specific subject, title, pictures or composing text. The sections that have been automated in this particular article include, an article's title, subtitle, header image, metadata (title tag, meta description, URL), introduction, links to players & teams, starting lineups, last game summaries, predictions and a team comparison stats table. The title is optimized to use the most descriptive terms and to use the keywords that the platform has identified as high-value keywords to target (preview, odds, TV, starting lineups, March Madness, etc.). The images are selected by the platform, choosing players based on keywords that have been mapped to an image, then the images are resized and stitched together. The introduction paragraph uses game information data and generates hundreds of variations of text. The starting lineup section pulls a team's starting lineup (or estimated starting lineup in some cases) and lists their name, internal link and position. For last game summaries, the platform finds insights from a team's last game. This includes, but is not limited to, the game result, best player on each team and stat leaders. Insights (such as the milestones, events and statistical analysis) can come from the Insight Engine, for example. The Insight Engine runs through multiple related database rows and calculates advanced insights from days, weeks, months and years of data.

Figure 7:
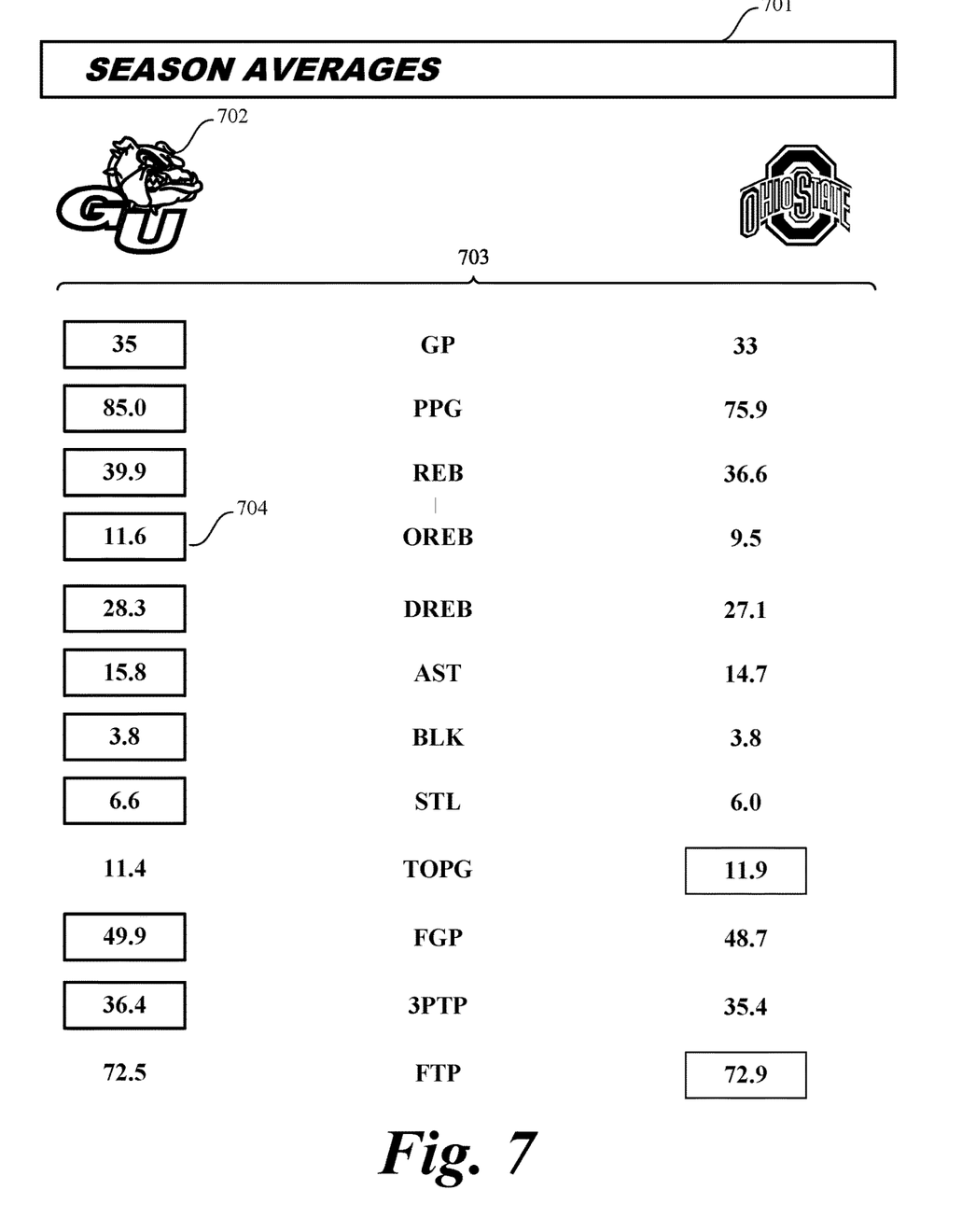
FIG. 7 is an example of content produced by a system according to an embodiment of the present invention.

FIG. 7 depicts additional content that can be created according to the system of the present invention. The present invention may automatically pull data, images, and forms from the database in order to populate and create new content. For example, the depicted team comparison table 701 may be included within an article as supplementary content or published on its own. Information 704 is pulled dynamically to populate the table 701. In the instant example, the information compares numerous key metrics between two opponents. The logos 702 for each team are also pulled and populate the table. The system may also dynamically show which team is better in a category, for example, as depicted the columns are optionally colored accordingly.

Figure 8:
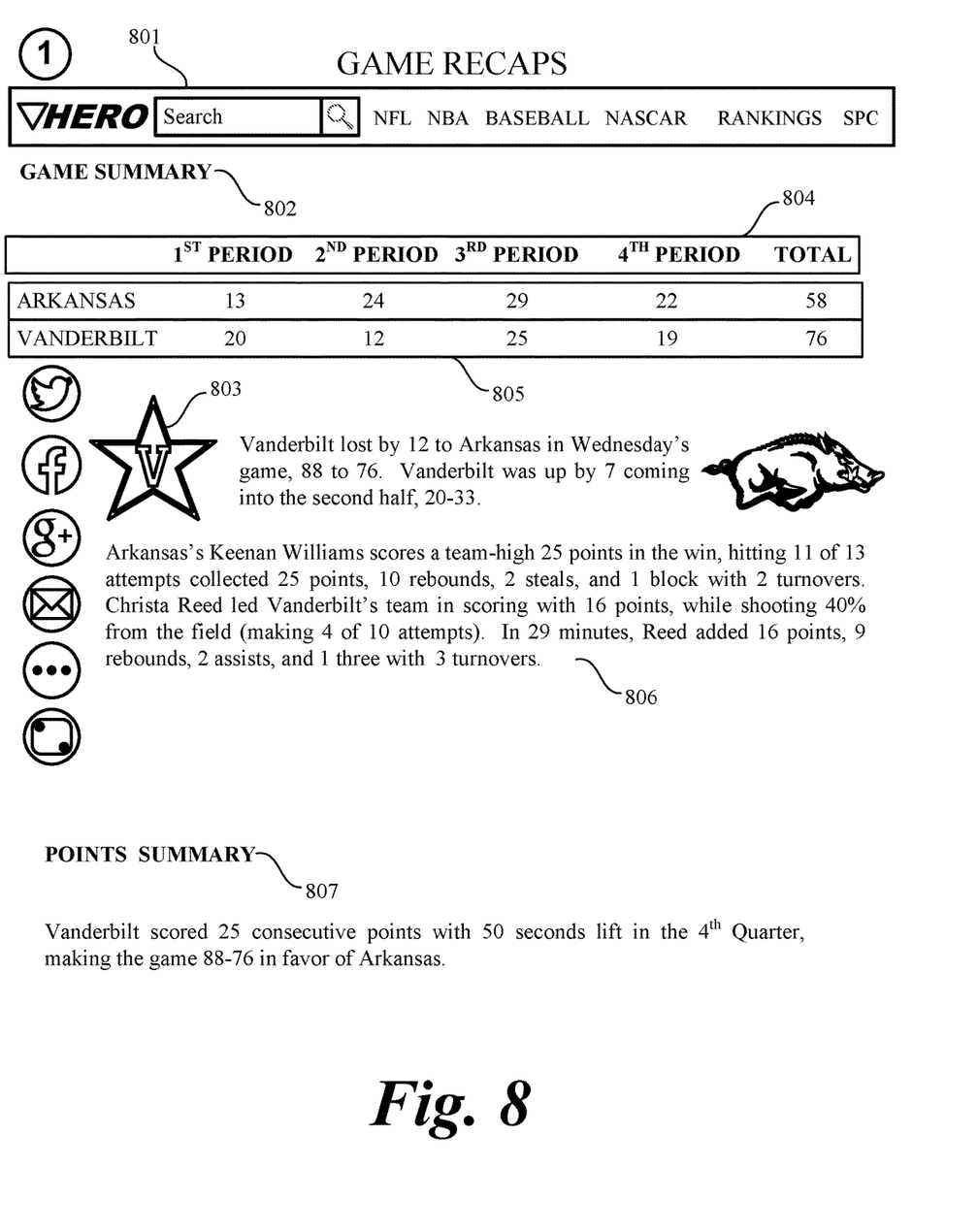
FIG. 8 is an example of content produced by a system according to an embodiment of the present invention.
Figure 9:
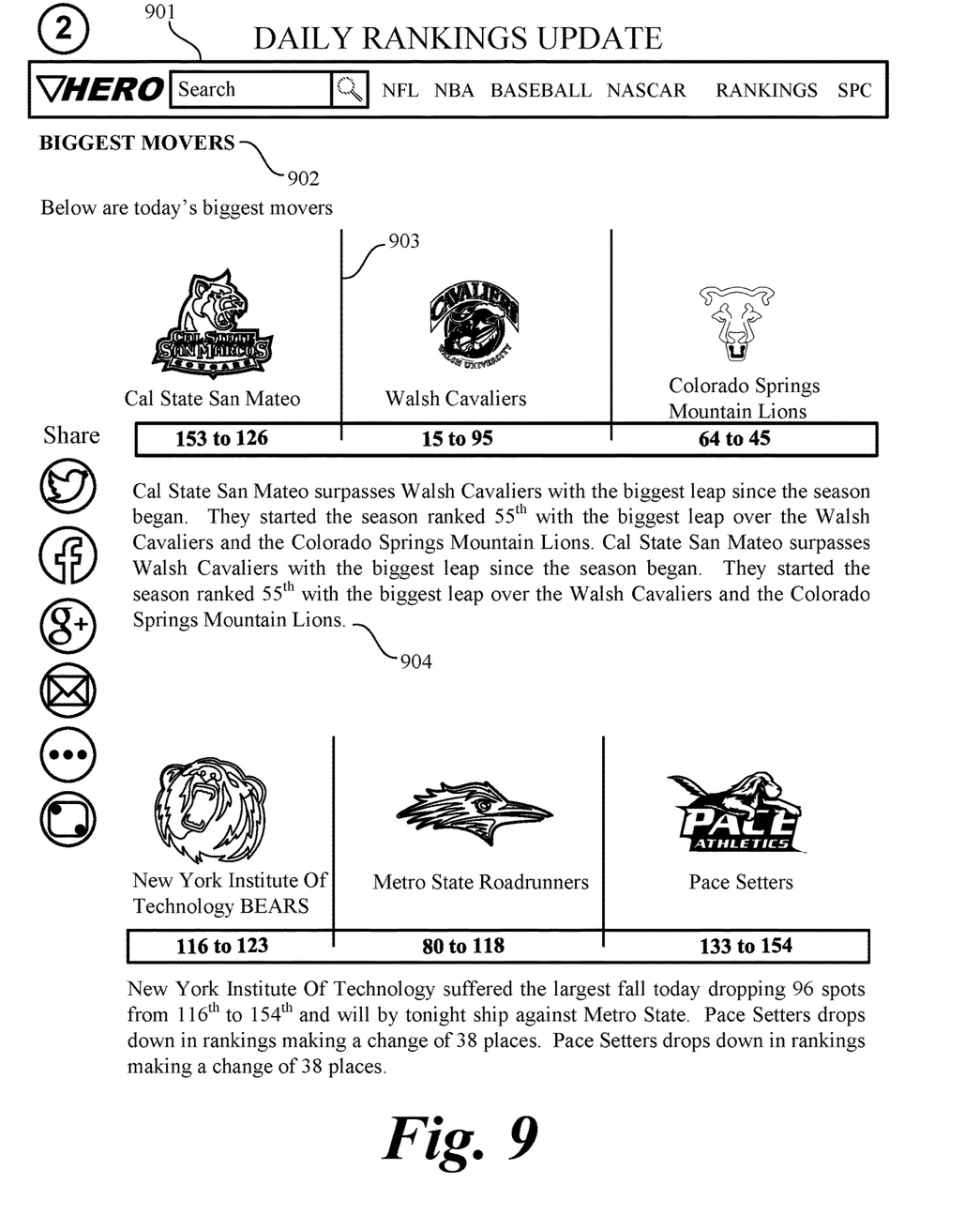
FIG. 9 is an example of content produced by a system according to an embodiment of the present invention.

Additional narrative examples include those depicted in FIGS. 8 and 9. FIG. 8 depicts an auto-generated game summary narrative according to an embodiment of the present invention. Each aspect of the narrative example is auto-generated. The narrative includes a title 802 "Game Summary" as well as a summary table 804 auto populated with information 805 that is relevant to the particular sport. Further, a narrative 806 is automatically drafted to summarize the game. In addition, the logos 803 for each team have been added to further legitimize and naturalize the piece. Additional content is included, for example, a point summary 807 provides additional details into the game.

FIG. 9 depicts another example of content automatically created by a system according to the present invention. A daily rankings update 901 provides daily content with information relevant to users. For example, this content can track they biggest movers 902 in standings. The update 901 can include logos and team names 903 as well as narratives 904 relevant to the various "biggest movers." The net change 905 in ranking is also included. All of this content is auto generated.

Consistent with the teachings of the present invention, Generated content may be pushed through many different channels in order to have maximum effect. For example, in addition to articles, social posts may also be created and published. In some examples, some of the content that appears in the social post may be pulled from the generated article. In preferred embodiments, the social post includes a link to the article itself.

Representative/exemplary data sets that can generate more successful articles. Utilizing the teachings of the present invention an article can be significantly more successful than other articles. For example, articles utilizing the teachings of the present invention have achieved around four times the page views. The present invention's ability to cull data, identify interest and opportunity, prepare content accordingly, and publish it to the best location produces this success As explained above, various methods according to the presently described invention include the steps of: (1) Identify topics, (2) leverage platform to analyze search activity, (3) Use ML to identify best opportunity (traffic), (4) Identify data set available in warehouse, (5) Deploy NLG to write optimized narrative, (6) content gets published.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-implemented method comprising the steps of:
   identifying a topic that drives a search volume over a network above a predetermined first level, attracts a number of referring domains below a predetermined second level and has a URL rating below a predetermined third level;
   employing natural language generation to automatedly compose a textual description of the topic;
   retrieving over the network one or more images pertaining to the topic;
   creating a webpage comprising the textual description and the one or more images; and
   posting the webpage to a predetermined website.

2. The method of claim 1, further comprising retrieving over the network one or more polls pertaining to the topic, wherein the webpage comprises the one or more polls.

3. The method of claim 1, further comprising retrieving over the network athlete profiles pertaining to the topic, wherein the webpage comprises the athlete profiles.

4. The method of claim 1, further comprising retrieving over the network athlete performance comparisons pertaining to the topic, wherein the webpage comprises the athlete performance comparisons.

5. The method of claim 1, further comprising retrieving over the network athletic team profiles pertaining to the topic, wherein the webpage comprises the athletic team profiles.

6. The method of claim 1, further comprising retrieving over the network athletic team performance comparisons pertaining to the topic, wherein the webpage comprises the athletic team performance comparisons.

7. The method of claim 1, further comprising retrieving over the network athletic event previews pertaining to the topic, wherein the webpage comprises the athletic event previews.

8. The method of claim 1, further comprising:
   retrieving over the network data from social media sources pertaining to the topic; and
   determining content of the textual description based on the data from social media sources.

* * * * *